United States Patent

Brightwell et al.

Patent Number: 5,829,644
Date of Patent: Nov. 3, 1998

[54] WINE AND CORK SEPARATOR

[76] Inventors: Edgar Neil Brightwell, 818 Knob Hill Ave., Redondo Beach, Calif. 90277; Daniel P. Brown, 2617 Gates Ave., Redondo Beach, Calif. 90278

[21] Appl. No.: 779,680

[22] Filed: Jan. 7, 1997

[51] Int. Cl.⁶ .............................. B01D 24/38; B67D 5/58
[52] U.S. Cl. .................. 222/189.07; 210/464; 210/466; 222/567
[58] Field of Search ................ 222/189.07, 563.567; 215/308; 210/464–469

[56] References Cited

U.S. PATENT DOCUMENTS

| 62,333 | 2/1867 | Holl ........................................ 215/308 |
| 728,426 | 5/1903 | Timar ...................................... 215/308 |
| 920,791 | 5/1909 | Tonini ..................................... 215/308 |
| 1,865,023 | 6/1932 | Leavy . |
| 3,081,912 | 3/1963 | Goceliak . |
| 3,235,133 | 2/1966 | Zimmerman et al. ......... 222/189.07 X |
| 3,311,275 | 3/1967 | Gibson .................................... 222/567 |
| 3,422,998 | 1/1969 | Murray ................................... 222/567 |
| 3,926,348 | 12/1975 | Lutzker . |
| 3,966,099 | 6/1976 | Sanford, Jr. et al. ............... 222/567 X |
| 4,555,341 | 11/1985 | Nugent . |
| 5,417,860 | 5/1995 | Kay . |

FOREIGN PATENT DOCUMENTS

| 385427 | 5/1908 | France ................................... 215/308 |
| 665468 | 9/1929 | France ................................... 222/567 |
| 949858 | 9/1949 | France ................................... 222/563 |
| 969779 | 12/1950 | France ................................... 222/567 |
| 2414483 | 10/1974 | Germany .............................. 222/567 |
| 3419572 | 12/1984 | Germany .......................... 222/189.07 |
| 264560 | 10/1949 | Switzerland ...................... 222/189.07 |
| 940996 | 11/1963 | United Kingdom ................... 222/567 |
| 2219520 | 12/1989 | United Kingdom ................... 210/466 |

*Primary Examiner*—Kevin P. Shaver
*Attorney, Agent, or Firm*—Lyon & Lyon LLP

[57] ABSTRACT

A wine and cork separating device for use with a wine bottle having a broken cork lodged in the neck portion thereof. The device includes an upper pouring spout and a hollow tubular member extending downwardly therefrom. The pouring spout defines a tapered outer wall so as to create a press fitment with the open end of the wine bottle upon being inserted therein and carries a cork and wine sediment filtering screen extending across the interior thereof. The tubular member defines a plurality of fluid passages proximate the lower end portion thereof to facilitate pouring of the wine through the device. The hollow tubular member is used both to drive the broken cork into the interior of the bottle and upon being inserted through the neck of the bottle such that the spout portion is held in a press fitment with the open end of the bottle, the tubular member projects through the interior of the neck portion of the bottle and prevents the cork from entering the neck portion and interfering with the wine being poured from the bottle.

5 Claims, 1 Drawing Sheet

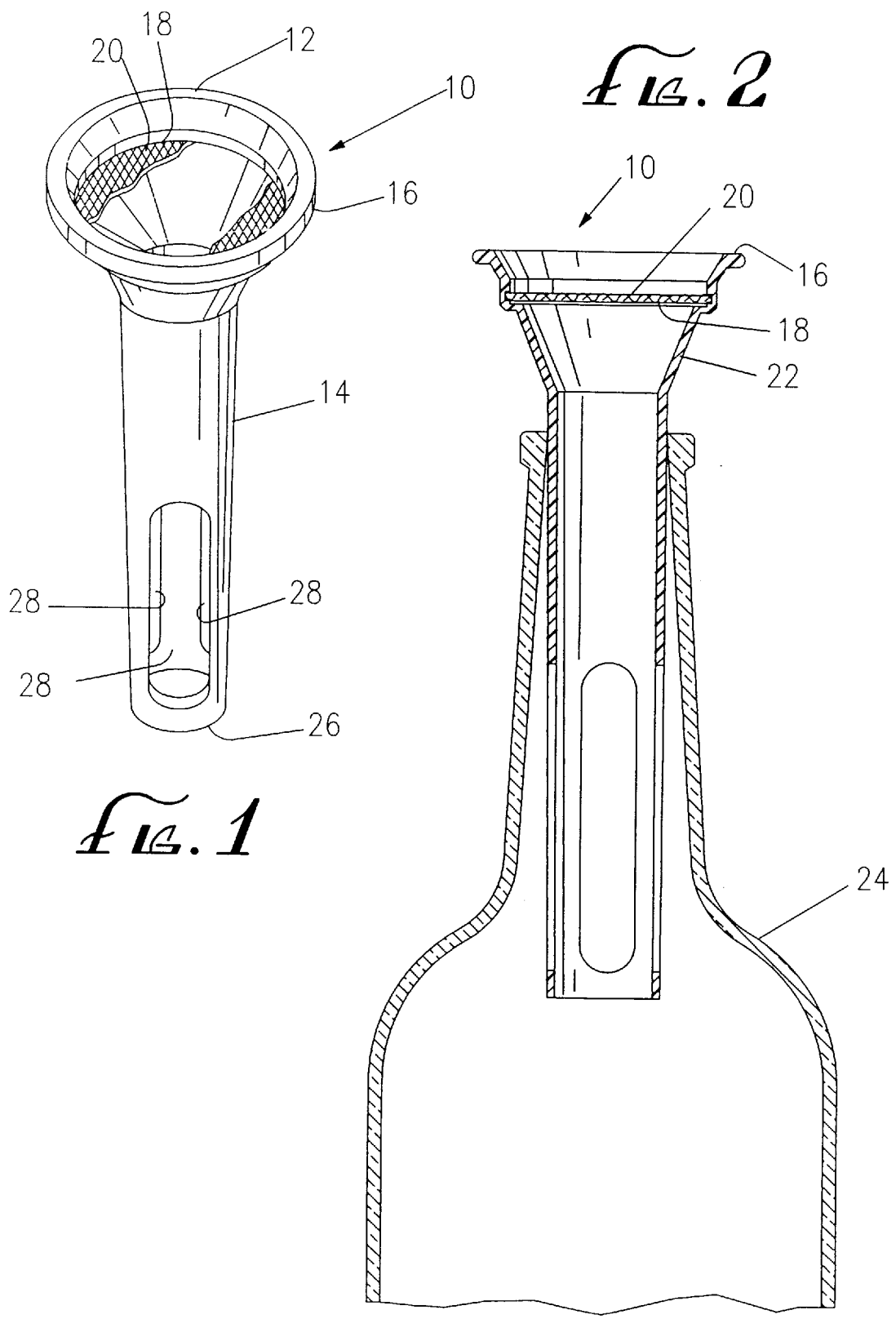

WINE AND CORK SEPARATOR

BACKGROUND OF THE INVENTION

Breaking the cork while attempting to open a bottle of wine is a common occurrence. Often a portion of the cork remains lodged in the neck of the bottle. Attempting to extract the remaining portion of the cork with a corkscrew frequently results in further breakage of the cork. It is then necessary to either pour the wine through a strainer to remove the remaining pieces of cork floating in the wine or leave the pieces of cork in the bottle so that they can be removed after the wine is poured into a glass. Alternatively a large piece of cork lodged in the neck of the bottle can be forced into the bottle with a suitable implement. While the piece of cork may be too large to pass from the bottle into a glass during pouring, the floating cork will interfere with the smooth pouring of the wine. Unfortunately, even with the more technically advanced devices for extracting corks from wine bottles, the conditions of the cork will often prevent its complete extraction.

Each of the above scenarios resulting from cork breakage is unpleasant and at the very least destroys the ambiance intended by the wine. Because of the frequency of such breakage it would be highly desirable to provide a device which would prevent a cork broken off in the neck of a wine bottle from interfering with the pouring and drinking of the wine. Such a device is provided by the present invention.

SUMMARY OF THE INVENTION

Briefly, the present invention comprises a tapered dripless pouring spout terminating at its lower end in an elongated hollow tubular extension. The tapered wall of the spout allows the device to be held in place by means of a press fit in the upper open end of any size of wine bottle. A filtering screen is carried by the pouring spout for preventing particles of broken cork and wine sediment from passing from the bottle. A plurality of elongated slots are provided in the side wall of the hollow tubular member proximate the lower end thereof to allow liquid and air to pass therethrough so as not to inhibit a free flow of wine through the extension and pouring spout during use.

In the event the cork were to break during its attempted extraction and the portion remaining in the neck of the wine bottle could not be readily removed in tact, the elongated tubular member of the separator is pressed firmly against the remaining portion of the cork, driving the cork into the bottle. The device is then inserted into the bottle such that a press fit is formed about the tapered spout. So secured, the tubular extension projects downwardly from the spout through the interior neck of the bottle. As the wine is poured, the press fit holds the device securely in place and the sifting screen carried by the spout prevents pieces of cork and sediment from being poured into a glass. Concurrently, the tubular member extends through the neck of the bottle and cooperates with the interior side wall of the bottle to prevent the large piece of cork which was driven into the bottle from passing into the neck of the bottle and interfering with the pouring of the wine.

It is the principal object of the present invention to provide a device which prevents a cork which has been broken off in the neck of a wine bottle from interfering with the pouring and drinking of the wine.

It is another object of the present invention to provide a device which allows wine to be readily poured from a bottle wherein pieces of the cork are floating in the wine without passing the cork pieces into the drinker's glass.

It is another object of the present invention to provide a device which prevents a portion of a broken cork which has been forced into a wine bottle from interfering with the smooth pouring of the wine from the bottle.

It is a further object of the present invention to provide a device which can be used to drive a portion of a cork which was broken during attempted extraction and remained lodged in the neck of the bottle into the interior of a bottle and then to prevent the piece of cork driven into the bottle from interfering with the smooth pouring of the contents from the bottle.

It is still another object of the present invention to provide a device for use with a wine bottle which prevents sediment in the wine from being poured with the wine into a drinker's glass.

These and other objects and advantages of the present invention will become readily apparent from the following detailed description taken in conjunction with the accompanying drawings.

BRIEF DESCRIPTION OF THE DRAWINGS

FIG. 1 is a perspective view of the wine and cork separator of the present invention.

FIG. 2 is a side view showing the separator of the present invention in place within a wine bottle.

DETAILED DESCRIPTION OF THE PREFERRED EMBODIMENT

The wine and cork separating device 10 of the present invention comprises a dripless pouring spout 12 and a hollow tubular extension 14 projecting downwardly from spout 12. Spout 12 defines a dripless annular pouring lip 16, an outwardly tapered wall portion 22 and an annual recess 18 in the interior of wall portion 22 in which a filtering screen 20 is held. The tubular extension 14 below spout 12 is also of a tapered configuration whereby the device 10 can be inserted in the open end of a wine bottle 24 of any conventional size and held in place by means of a press fitment between the bottle and the tubular extension 14. Tubular extension 14 is preferably open at the lower end 26 thereof to facilitate manufacture and increase air and liquid flow therethrough and defines a plurality of elongated slots 28 proximate the lower end 26 thereof for the passage of liquid and air therethrough. While three such slots are shown in the embodiment illustrated in the drawings, two oppositely disposed slots could be employed as well as other aperture configurations. The filtering screen 20 is preferably formed of stainless steel and a mesh size within the range of 20×20 to 12×12 is preferably employed to provide both adequate structural strength and filtering ability. In an alternate embodiment, the device 10 could be of single-piece construction wherein the filtering screen would be formed by an injection molding process.

In the preferred configuration of device 10, the device is injection molded of a relatively rigid styrene or nylon-type material, although the device could be constructed of aluminum, stainless steel or even sterling silver if desired. The overall length of device 10 preferably ranges from about five to seven inches to provide adequate extension of the tubular portion 14 of the device into the neck of the wine bottle 24 such that extension 14 cooperates with the side wall of the bottle to prevent any large pieces of cork within the bottle from passing into the interior of the neck of the bottle and interfering with the smooth pouring of the wine. The outer diameter of extension 14 tapers from about 0.775 in. at the upper end thereof to about 0.645 inches at the lower end and defines a taper of about 0.5° from bottom to top. These dimensions allow the device 10 to form a press fit with any conventional wine bottle. The inner diameter of extension 14 will vary depending on the material and method of manufacture. For stainless steel, the wall thickness should be about 0.015–0.020 inches. Thus the inner diameter of extension 14 would be about 0.745 in. at the top and 0.635 in. at the bottom. For aluminum, the wall thickness would be about 0.030 to 0.040 in. For a device molded of high impact polystyrene, the wall thickness of extension 14 could be about 0.040–0.060 in. at the top, about the same at the bottom and preferably increases at a slight taper up to a thickness of about 0.080 in. proximate of the upper ends of slots 28 for additional structural support in that area. These dimensions, of course, will vary depending on the material used and the method of manufacture. Spout 12 defines an external diameter, including lip 16, of about 1.75 inches. In the embodiment of slots 28 shown in the drawings, the three slots each define a minimum length of about one inch and a width of about 0.250 inches. If only two slots were employed the length of each slot should be at least 1.7 in. and the width 0.310 in. to obtain adequate flow conditions during use. If the lower end 26 of tubular extension were closed, the slots should be larger to allow for the desired volume of fluid flow therethrough.

In the event a cork (not shown) is broken during attempted extraction with a corkscrew or other wine cork removing device such that a portion of the cork remains lodged in the neck of the bottle, the separating device 10 is gripped about the pouring spout portion 12 and the lower end 26 of extension 14 is used to drive the lodged portion of the cork into the interior of the bottle. Attempting to remove the lodged portion of the cork might further fragment the cork. The separating device 10 is then secured in place as shown in FIG. 2. So secured in the open end of the bottle, the tubular extension prevents any large pieces of the broken off cork from interfering with the pouring of the wine. The slots 28 in the lower end thereof allow both air and wine to pass through device 10 so as to ensure an even flow of wine through device 10. As small pieces of cork and sediment can pass through tubular extension 14, the filtering screen 20 is employed to prevent such pieces from passing into the drinker's glass. Because the device is used not only for pouring, but also to force the broken cork into the bottle, a mesh size above 20 by 20 in sifting screen 20 would render the screen too soft such that it might be susceptible to damage during use.

The device 10 of the present invention could also be used in lieu of a corkscrew to open wine bottles when the cork was not broken and could be usefully employed in other applications to prevent floating or other debris from being poured from a bottle or other open-mouthed container. Various other changes and modifications may be made in carrying out the present invention without departing from the spirit and scope thereof. Insofar as these changes and modifications are within the purview of the appended claims, they are to be considered part of the present invention.

We claim:

1. A wine and cork separating device for use with a wine bottle having a broken cork lodged in the neck portion of the bottle, said device comprising a pouring spout having an outwardly tapered wall, a filtering screen carried by said wall in an upper portion of said spout and extending across the interior of said spout, a hollow tubular member extending downwardly from said spout, said member having a tapered wall for forming a press fitment with the neck portion of the bottle upon said member being inserted into the neck portion and defining a plurality of elongated open slots equidistantly spaced about a lower end portion thereof for the passage of fluid therethrough, said tubular member being adapted to be driven against the lodged cork to force the cork into the bottle and upon forming said fitment with the bottle, extends through said neck portion of said bottle and prevents the cork from entering the neck portion while the wine is poured from the bottle through said device.

2. A wine and cork separating device for use with a wine bottle having a broken cork lodged in the neck portion of the bottle, said device comprising a pouring spout having an outwardly tapered wall, a filtering screen defining a mesh size within the range of 20×20 to 12×12 carried by said wall in an upper portion of said spout and extending across the interior of said spout, a hollow tubular member extending downwardly from said spout, said member having a tapered wall for forming a press fitment with the neck portion of the bottle upon said member being inserted into the neck portion and defining a plurality of elongated open slots equidistantly spaced about a lower end portion thereof for the passage of fluid therethrough, said tubular member being adapted to be driven against the lodged cork to force the cork into the bottle and, upon forming said fitment with the bottle, extends through said neck portion of said bottle and prevents the cork from entering the neck portion while the wine is poured from the bottle through said device.

3. The wine and cork separator of claim 2 wherein the transverse dimension across said screen is substantially greater than any transverse dimension taken across said tubular member.

4. The wine and cork separator of claim 4 wherein said device defines a longitudinal dimension of about 5 inches such that said tubular member extends through the neck portion of wine bottles of varying configurations and dimensions.

5. A wine and cork separating device for use with a wine bottle having a broken cork lodged in the neck portion of the bottle, said device comprising a pouring spout having an outwardly tapered wall, said wall having an annular channel therein, a filtering screen defining a mesh size within the range of 20×20 to 12×12 carried by said wall in said channel and extending across the interior of said spout, a hollow tubular member extending downwardly from said spout, said member having a tapered wall for forming a press fitment with the neck portion of the bottle upon said member being inserted into the neck portion and defining a plurality of elongated open slots equidistantly spaced about a lower end portion thereof for the passage of fluid therethrough, said tubular member being adapted to be driven against the lodged cork to force the cork into the bottle and, upon forming said fitment with the bottle, extends through said neck portion of said bottle and prevents the cork from entering the neck portion while the wine is poured from the bottle through said device.

* * * * *